(12) United States Patent
Halberstadt

(10) Patent No.: US 10,090,775 B2
(45) Date of Patent: Oct. 2, 2018

(54) DISCHARING AN INPUT CAPACITOR OF A SWITCH MODE POWER SUPPLY

(71) Applicant: NXP B.V., Eindhoven (NL)

(72) Inventor: Hans Halberstadt, Groesbeek (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/062,390

(22) Filed: Mar. 7, 2016

(65) Prior Publication Data

US 2016/0268919 A1 Sep. 15, 2016

(30) Foreign Application Priority Data

Mar. 13, 2015 (EP) ..................................... 15158979

(51) Int. Cl.
- *H02M 1/32* (2007.01)
- *H02M 7/06* (2006.01)
- *H02M 1/42* (2007.01)
- *H02M 1/44* (2007.01)

(52) U.S. Cl.
CPC ............... *H02M 7/06* (2013.01); *H02M 1/32* (2013.01); *H02M 1/42* (2013.01); *H02M 1/44* (2013.01); *H02M 2001/322* (2013.01)

(58) Field of Classification Search
None
See application file for complete search history.

(56) References Cited

U.S. PATENT DOCUMENTS

| 8,760,200 B2 | 6/2014 | Choung et al. |
| 8,848,321 B2 | 9/2014 | Halberstadt |
| 2003/0058593 A1* | 3/2003 | Bertele ............. H03K 17/0822 361/63 |
| 2007/0177322 A1* | 8/2007 | Jacobs ..................... H03F 1/52 361/100 |
| 2009/0027096 A1* | 1/2009 | Mourrier ............. H03K 17/166 327/170 |
| 2011/0025278 A1 | 2/2011 | Balakrishnan et al. |
| 2011/0080149 A1 | 4/2011 | Fukuta et al. |
| 2011/0215959 A1 | 9/2011 | Matsuzawa et al. |

(Continued)

FOREIGN PATENT DOCUMENTS

| CN | 101989810 A | 3/2011 |
| CN | 102437725 A | 5/2012 |

(Continued)

OTHER PUBLICATIONS

Extended European Search Report for application No. 15158979.3 (dated Sep. 15, 2015).

*Primary Examiner* — Jeffrey Gblende

(57) ABSTRACT

A method is disclosed of discharging an input capacitor of a switch mode power supply comprising a power switch and the input capacitor, through the power switch and in response to disconnection of the switch mode power supply from a mains supply, the power switch having a control terminal and main terminals; the method comprising a repeated sequence, the sequence comprising: charging the control terminal to partially close the power switch until a comparator indicates that a capacitor discharge current from the capacitor through the main terminals is equal to a reference signal; and thereafter discharging the control terminal, thereby stopping the capacitor discharge current. A corresponding control and power supply is also disclosed.

14 Claims, 7 Drawing Sheets

(56) References Cited

U.S. PATENT DOCUMENTS

| | | |
|---|---|---|
| 2012/0019178 A1 | 1/2012 | Kono et al. |
| 2014/0177287 A1* | 6/2014 | Cho .................. H02M 3/33507 363/21.09 |
| 2014/0253062 A1* | 9/2014 | Qin ........................... G05F 1/10 323/271 |
| 2014/0312963 A1* | 10/2014 | Berkhout ................ G05F 3/262 327/543 |
| 2015/0280416 A1* | 10/2015 | Kreuter .................. H01H 83/00 361/55 |

FOREIGN PATENT DOCUMENTS

| | | |
|---|---|---|
| CN | 103378714 A | 10/2013 |
| CN | 103383581 A | 11/2013 |

* cited by examiner

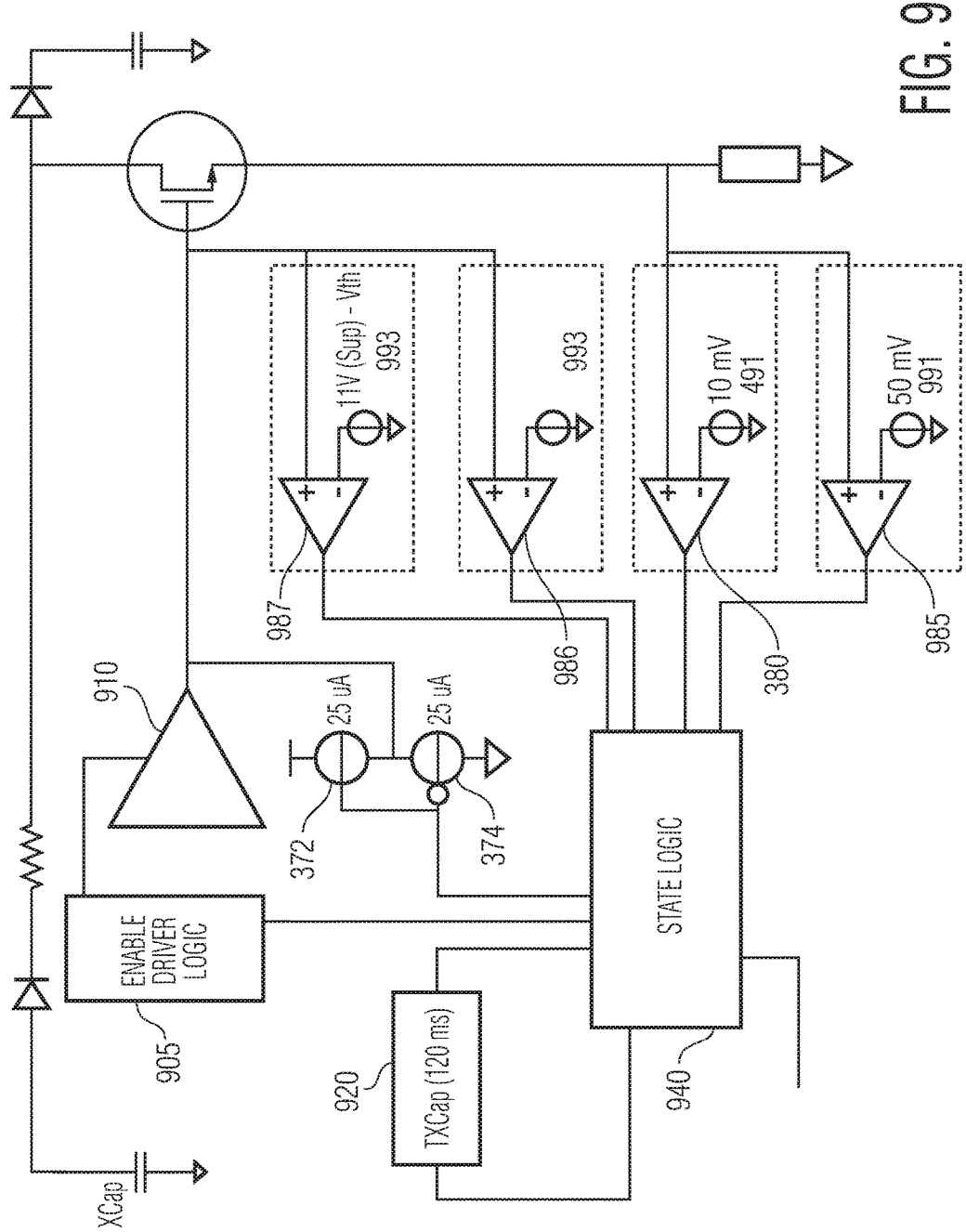

DISCHARGING AN INPUT CAPACITOR OF A SWITCH MODE POWER SUPPLY

CROSS-REFERENCE TO RELATED APPLICATIONS

This application claims the priority under 35 U.S.C. § 119 of European patent application no. 15158979.3, Mar. 13, 2015 filed the contents of which are incorporated by reference herein.

FIELD

The present invention relates to methods of discharging input capacitors in switch mode power supplies, to switch mode power supplies, to power factor correction stages of switch mode power supplies, and to controllers therefor

BACKGROUND

In order to suppress electromagnetic interference (EMI) of AC-DC switched mode power supplies (SMPS), in most cases an input filter is required on their input side. In addition to an inductance, EMI filters typically include one or more capacitors connected between the mains terminals. These capacitors are also known as X-caps. EMI filters typically also include one or more capacitances connected between one of the mains terminals and a protective Earth (which are also known as Y-caps). Typically, this protective Earth takes the form of a secondary ground, to which the Y-caps are connected, whereas typically the bridge rectifier is grounded to a separate primary ground; the primary and secondary grounds have mains separation, but may typically be connected by one or more further Y-caps.

It is desirable, and in some regulatory regimes it may be mandatory, that the voltage between the mains terminals of the switched mode power supply is reduced to a safe value within a certain time after the mains is unplugged. Otherwise, there remains a risk of electrical shock to the user, by inadvertently contacting the terminals of the plug.

As examples, according to the international Safety Requirement standard. IEC600665 for audio, video and similar electronic apparatus, it is required that within 2 seconds of a power supply being unplugged, the voltage between the terminals should be less than 60 V. Further, according to IEC60950, the decrease should occur within one second. When the mains supply to the SMPS is disconnected, for instance by the mains being unplugged, residual charge on the X-caps and Y-caps may initially result in a voltage which is above the safe level.

If the power supply is operating and fully loaded, the load will in most instances rapidly result in the discharge of the charge on the capacitors. However, under no-load conditions, the power supply may have been disabled or disconnected from any load; also, under conditions where the mains voltage has fallen below acceptable levels, (so-called "brownout" conditions), the power supply may have been switched off. Under such conditions, capacitances on the output side of the rectifier may prevent discharge of the x-cap and y-cap capacitors, on the input side of the rectifier, to an acceptable level within an acceptable period.

Thus, further measures may be required to ensure the capacitors are appropriately discharged under such conditions. It is known to provide an additional resistor discharge network in parallel with the mains input, in order to allow for such discharging. In one known configuration, the discharge resistors are adapted to also be used as sense resisters, to measure the instantaneous mains voltage, for brownout protection.

SUMMARY

According to a first aspect, there is disclosed herein a method of discharging an input capacitor of a switch mode power supply comprising a power switch and the input capacitor, through the power switch and in response to disconnection of the switch mode power supply from a mains supply, the power switch having a control terminal and main terminals; the method comprising a repeated sequence, the sequence comprising: charging the control terminal to partially close the power switch until a comparator indicates that a capacitor discharge current from the capacitor through the main terminals is equal to a reference signal; and thereafter discharging the control terminal, thereby stopping the capacitor discharge current.

Most existing resistive discharge solutions suffer the disadvantage that the resistors dissipate power. Although this power dissipation, which for a typical application may be between 20 and 100 mW, is insignificant under most fully loaded conditions, under conditions of no-load, it is relatively high.

By providing a sequence in which the control terminal is repeatedly charged and then discharged, it may be possible in embodiments according to this aspect to discharge the x-cap through the power switch, so the energy is dissipated in the power switch rather than through resistive components, and it may at the same time be possible, not to require operating the power switch in linear mode. Setting of a proper current level for operation in linear mode would be difficult because the normally used sense resistor is extremely low-ohmic (of the order of 25-50 mohm); controlling a power switch in linear mode, whilst the complete mainsvoltage falls across the PFC switch, would normally require operation outside of the switch safe operating area region (SOAR). Another issue with driving a switch in linear mode with high currents is the risk for local oscillations in the switch; such oscillations could be destructive, particularly if the switch is an MOS transistor. The required current levels to prevent local oscillations and SOAR issues are in the order of 1-10 mA, which in turn requires a voltage across the sense resistor in the range below 1 mV Control at such low levels generally requires specific solutions based on auto-zero amplifiers, chopper amplifiers or offset trimmed amplifiers, which are expensive and therefore not compatible with application in consumer products. Also with such low voltage levels, parasitic currents in the PCB tracks can introduce voltages that cannot be neglected and may disturb the level set for the X-cap discharge current.

In one or more embodiments, discharging the control terminal commences immediately the comparator indicates that the current through the main terminals is equal to a reference current. In other embodiments, there is a delay between the moment that the comparator indicates that a capacitor discharge current from the capacitor through the main terminals is equal to a reference signal, and commencement of the discharge. The delay might, for instance, have a fixed period, or the discharging may commence a specified time after the charging starts.

The sequence may further comprise calibrating the comparator. Calibrating the comparator as part of the sequence, and thus periodically or at least repeatedly, may allow for more accurate control of the charging period, and in particular may provide for more accurate control of the peak current which is allowed through the main terminals. The peak current may then be set to be closer to the maximum safe design limit. In other embodiments, calibrating the comparator may not be required and may not be included.

The sequence of charging and discharging the control terminal may be termed a pair. In one or more embodiments, the sequence further comprises a further (N−1) pairs of charging and discharging the control terminal, such that the comparator is calibrated between each group of N pairs of charging and discharge the control terminal. By repeating the charging-discharging pair multiple times between each calibration interval, comparatively less time is spent in calibration, thereby enabling faster discharge of the X-cap. In one more embodiments, calibrating the comparator comprises connecting both its inputs to a common ground, whereas in other embodiments, calibrating the comparator comprises connecting both its inputs to another, common, level, for instance by simply connecting them together.

In one more embodiments the control terminal charging current is half the control terminal discharging current. Providing a fixed ratio between the control terminal charging current and the control terminal discharging current may allow designing the shape of the capacitor-discharging current pulse through the power switch.

In one or more embodiments, the method further comprises comparing the current through main terminals with a further reference signal which is higher than the reference signal, and terminating the method in response to the current through the main terminals being higher than the further reference signal. The comparison provided by this comparator may thereby provide a safety function; in particular, in embodiments this may prevent the control terminal of the power switch from being over-charged such that the switch is fully on, in certain low voltage situations where the X-cap has been discharged to a relatively low voltage.

In one of more embodiments, the method includes disabling the sequence for a pre-determined time period. Disabling the sequence may thereby prevent the charging-discharging from restarting for the pre-determined time period. This may provide a safeguard against overvoltage, particularly in the event that the SMPS is repeatedly reconnected to a mains supply. Moreover, the method may further include comparing the gate voltage with a high-voltage threshold (which may be indicative that has been continuously charging due to inadequate voltage from the supply to trigger the capacitor discharge current), and in response to the gate voltage exceeding the high-voltage threshold enabling the gate driver to operate the power switch in a normal operation mode (in particular to fully discharge the power switch gate).

In one or more embodiments the duration of the sequence is fixed. In other embodiments the duration of the sequence may depend on the duration of the current pulse through the power switch. In particular, the comparator may be calibrated immediately the control terminal is discharged, or, in embodiments in which there are multiple charging-discharging pairs between each calibration, a subsequent charging-discharging pair may start immediately the control terminal is discharged.

According to another aspect of the present disclosure, there is disclosed a controller for a switched mode power supply connectable to a mains supply and comprising an input capacitor and a power switch, the power switch having a control terminal and main terminals, the controller comprising: a comparator configured to compare a capacitor discharge current from the capacitor through the main terminals with a reference signal; a switch driver to control the power switch; a charging current source; and a discharging current source; wherein the controller is configured to operate a repeated sequence, in response to disconnection of the switch mode power supply from a mains supply, the sequence comprising: charging the control terminal by means of at least the charging current source to partially close the power switch until a comparator indicates that the capacitor discharge current is equal to a reference current; and discharging the control terminal by means of at least the discharging current source.

One or more embodiments may further comprise a safety comparator configured to compare the current through the main terminals with a further reference signal and to immediately discharge the control terminal in response to the current through the main terminals being greater than the further reference signal.

According to a further aspect of the present disclosure, there is provided a switch mode power supply comprising a controller as just set forth, a power switch, and an input capacitor.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which:

FIG. 9 shows a according to one or more other embodiments;

Figure 1:
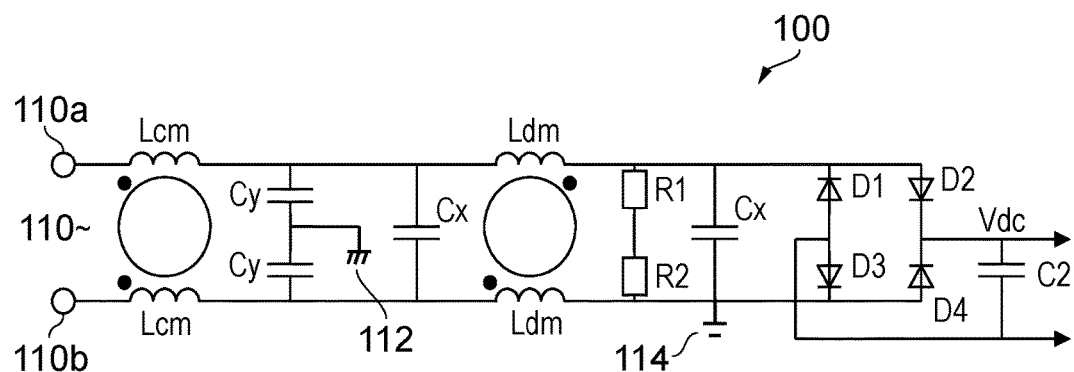
FIG. 1 shows a circuit diagram of an input filter and rectifier.

It should be noted that the Figures are diagrammatic and not drawn to scale. Relative dimensions and proportions of parts of these figures have been shown exaggerated or reduced in size, for the sake of clarity and convenience in the drawings. The same reference signs are generally used to refer to corresponding or similar features in modified and different embodiments.

DETAILED DESCRIPTION OF EMBODIMENTS

FIG. 1 shows a circuit diagram of an input filter and rectifier; the circuit 100 has an input 110, having live and neutral terminals 110a and 110b, for connection to a mains voltage together with a protective earth terminal (not shown) for connection to a protective earth 112, and has a common mode inductance Lcm. In this example input filter, there is a pair of Y capacitors (Y-Caps) Cy connected between a secondary ground (that is to say, to a ground on the output, or secondary, side of the SMPS) and the respective mains terminals 110a and 110b. The input filter is shown as having two X capacitors (X-Caps) Cx, connected to the input terminals 110a and 110b, one either side of the differential mode inductance Ldm. The input filter shown further has a pair of series connected resistors R1 and R2 connected across the input terminals. The input filter described above is connected to a full-bridge rectifier comprising diodes D1-D4, the output of which is connected to the next stage, and has smoothing capacitor C2 there-across. The primary ground side 114 of the rectifier output may be connected to the protective earth by a further Y-Cap (not shown). Since the protective earth 10c is typically connected to the secondary ground, this Y-Cap thus provides a short path between primary and secondary grounds.

In the filter shown, the resistors R1 and R2 may provide two functions. Firstly, they may provide the function of acting as discharge resistors in order to reduce the voltage across input terminals, upon the event of the mains being disconnected by for instance unplugging the unit. Secondly, the resistors may provide instantaneous voltage sensing in order to implement brownout protection.

In such a filter, the current for discharging the capacitances across the input is directly related to an additional power drawn from the input under nominally no-load conditions. For a typical value of capacitance at the inlet of 220 nF 1 µF, in order to achieve a discharge time or 2 seconds or less from the mains voltage of 325V down to 60 V (requiring a time of 1.7 times the RC time constant τ), requires a total resistance R1+R2 of 1.2 MΩ or less; this would typically result in a 11-44 mW power consumption, using power=230$^2$/R, with R being 1.2 MΩ (at 1 µF), to 4.8 MΩ (at 220 nF).

In one or more embodiments consistent with the present disclosure, R1 and R2 are no longer required to discharge residual stored charge upon disconnection of the mains; the upper bound to their resistance is therefore no longer applicable, and R1 and R2, if used at all, may be chosen to have a sufficiently high resistance to provide a negligible drain on power. Thus according to one or more embodiments consistent with the present disclosure. R1 and R2 may serve only to provide a voltage sensing function, for instance, for the implementation of brownout protection.

Figure 2:
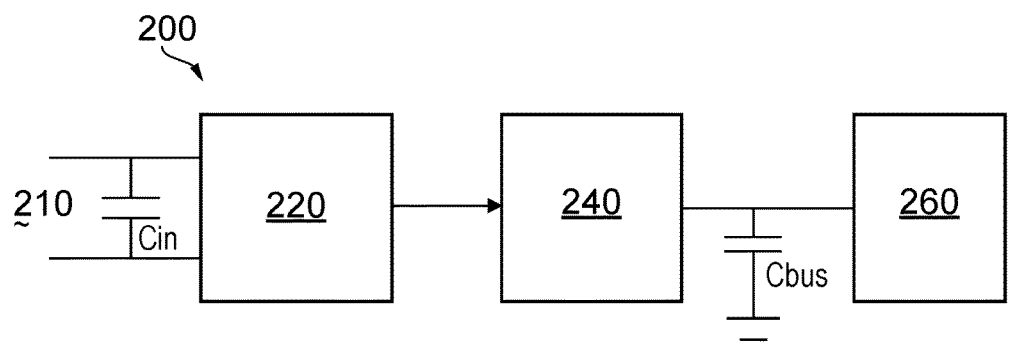
FIG. 2 shows a simplified block diagram of a SMPS.

FIG. 2 shows a simplified block diagram of a switched mode power supply 200. SMPS 200 includes a mains input 210, and sequentially a filter and rectifier stage 220, an optional power factor correction (PFC) stage 240, and a second stage being a converter stage 260. A capacitor Cbus may be connected between a node, between PFC stage 240 and a second stage 260, and ground.

Figure 3:
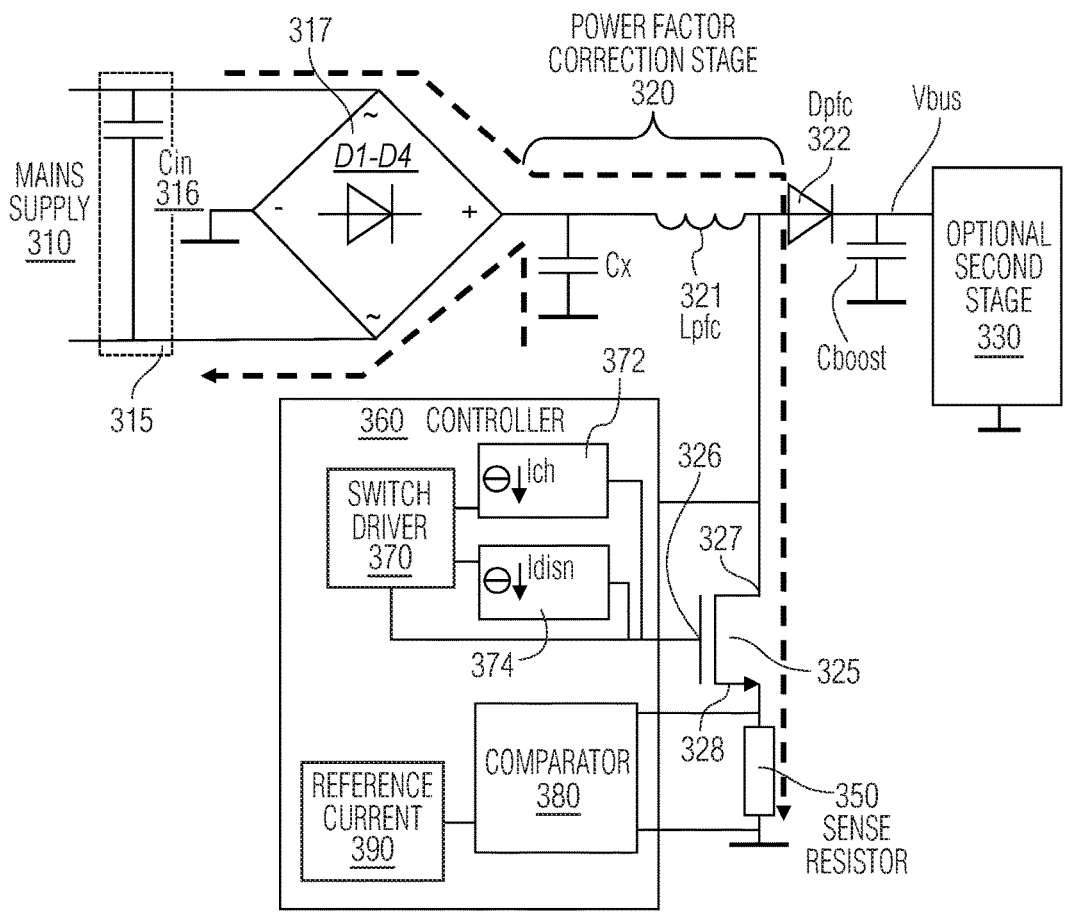
FIG. 3 shows a SMPS consistent with one or more embodiments.

FIG. 3 shows a switch mode power supply consistent with one or more embodiments. The switch mode power supply is connected to a mains supply 310. A mains EMI filter is shown schematically at 315 and comprises input capacitance Cin 316 (which typically is, or comprises an X-Cap, since Cin is the total capacitance as seen between the terminals, so includes Xcaps (numbering 2 in FIG. 1)—for example it may also include the Y-Caps Cy from FIG. 1). The rectification stage may, as shown comprise a bridge rectifier 317 consisting of four diodes D1-D4. There may be a filter capacitor Cx on the DC side of the bridge rectifier 317 and forming part of a power factor correction stage 320. The power factor correction stage comprises an inductor Lpfc 321, connected between the DC side of the bridge rectifier 317 and an optional second stage 330 of the SMPS, with a diode Dpfc 322 therebetween, and a power switch 325 between the inductor and ground. The power switch has a control terminal 326 and main terminals 327, 328. A sense resistor 350 is arranged in series with the power switch 325. The current through the power switch 325 may be determined by measuring the voltage across the sense resistor 350. There may be, as shown, a capacitor Cboost on the output side of the power factor correction stage 320.

The SMPS includes a controller 360, and comparator 380, as shown. As will described more detail below, the comparator 380 is configured to compare a capacitor discharge current from the capacitor Cin 316 through the main current path of the switch (that is, through the main terminals, 327 and 328), with a reference current 390; the controller further comprises a switch driver 370 to control the power switch. During normal operation, the switch driver 370 typically fully opens and fully closes the switch periodically. Again as will be described in more detail hereinbelow, during the capacitor discharge, the driver 370 may only partially close the power switch 325. The controller further comprises a charging current source 372 and a discharging current source 374; the charging and discharging current sources 372, 374 respectively provide a current to charge the gate of the power switch at a controlled rate, and to discharge the gate of the power switch at a second controlled rate which may be the same as, or different from, the first controlled rate.

Figure 4:
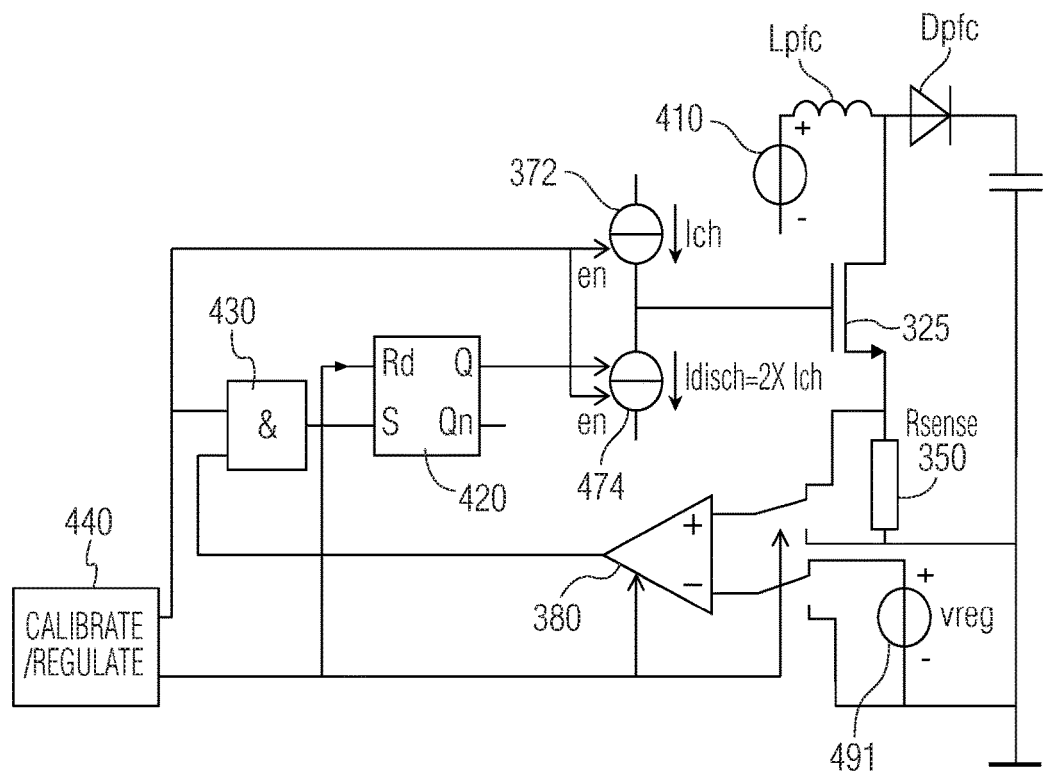
FIG. 4 shows a PFC stage according to one more embodiment.

FIG. 4 shows a power factor correction stage according to one more embodiments in more detail, in which the interconnection between the functional blocks in the controller 360 are shown in more detail. In FIG. 4, the rectified mains voltage is shown schematically as a voltage source 410 connected to the PFC inductor Lpfc 321 and PFC diode Dpfc 322. During X-cap discharge mode, the normal gate driver (not shown in the figure) is disabled and replaced by the 2 current sources Ich and Idisch, 372 and 374 respectively. In at least this embodiment, the comparator 380 does not directly compare the current through the power switch with a reference current: rather it compares a voltage across the sense resistor 350 with a reference voltage 491. The skilled person will appreciate that the voltage across the sense resistor is representative of the current to the power switch, and the reference voltage 491 may be used instead of a reference current source which is shown at 390 in FIG. 3. In general terms, a signal indicative of the current through the power switch is compared with a reference signal.

A repetitive sequence occurs that consists of a calibration interval and one or more regulation intervals. As will be discussed in more detail hereinbelow, in some embodiments the sequence does not include a calibration interval. Whether, at any moment, the PFC is in a calibration interval or a regulation interval is determined by logic circuit regulate/calibrate 440, which may include a timing circuit (as will be discussed in more detail with reference to FIG. 5). During the calibration interval, the comparator inputs are connected together, and in particular but without limitation may be shorted to ground, while the comparator follows an autozero sequence. The skilled person will be familiar with the process of auto-zeroing a comparator, in order to calibrate it. Outside the calibration interval, the inputs of the comparator are connected to the sense resistor Rsense 350 and to the reference voltage source Vreg 491.

A latch 420 is included that holds the charge/discharge state. The latch is reset by its "Reset" input, that is to say, the gate driver is put into charge mode, at the beginning of the calibration cycle, when the "calibrate" output from calibrate/regulate logic circuit 440 goes high; however the actual charging process is enabled only during the regulation interval.

At the beginning of the regulation interval, the charge/discharge current is enabled. The charge current source 372 then charges the gate of power switch 325 at a controlled rate. The gate-source voltage Vgs of the power switch 325 thus increases, and the switch starts to close—that is to say, it partially closes, to allow current to flow between its main terminals 327 and 328. As Vgs increases, this current increases until it reaches a predetermined current level, which is set by the comparison of Vrsense with Vreg in the comparator 380. Once this level is reached, the comparator output goes high. This output is combined in "AND" logic 430 with a "regulate" output of the regulate/calibrate logic 440, and passed to the "Set" input of the latch 420: the latch is thereby set, and the gate is discharged by the discharge current Idisn. In the embodiment shown in FIG. 4, the charge current Ich is not disabled at this moment, so the discharge current is equal to the difference between the two current sources, that is to say, Idis=Idisch−Ich. The skilled person will appreciate that, in other embodiments, the charging current might be disabled when the discharging current is enabled. The charge/discharge current in combination with the gate source capacitance may ensure that the rate of change of current (di/dt) through the power switch and therefore the inductor Lpfc 321 is sufficiently low of the drain current such that no, or negligible, power conversion will take place.

Thus, the repetitive sequence using relative low charge/discharge currents may allow the creation of a pulsed mode of operation without any significant energy transfer to the output, while the pulsed mode may also allow to Seta better optimum between SOAR requirements and Rsense detection levels.

Figure 5:
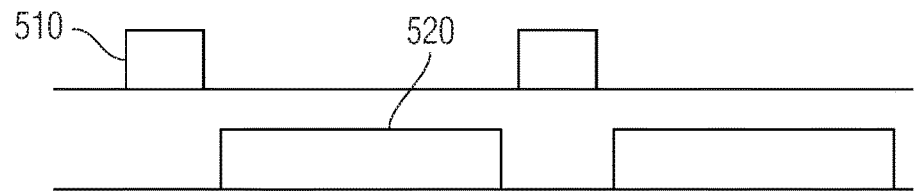
FIG. 5 shows the calibration and regulation intervals.

FIG. 5 shows the calibration and regulation intervals 510 and 520 respectively. As can be seen from FIG. 5 there is one regulation interval following each calibration interval. However, in other embodiments there may be two or more regulation intervals between each calibration interval. This may be enabled, for instance by including a further comparator (not shown in FIG. 4) to determine when the current through the power switch has returned to 0, or a suitably low level—and then disabling the discharge current source, and re-enabling the charging current source if appropriate, in order to repeat the charging-discharging pair of operations one or more further times before the next calibration interval. In one or more other embodiments, two or more regulation intervals may be enabled by checking when Vgs 630 reaches a level close to zero, for instance by a comparator as just described, and then starting the next charge-discharge sequence after a wait interval or delay. Including a wait interval or delay may allow a reduction in the number of pulses per unit time, thereby allowing a lower average current for a given peak current.

Figure 6:
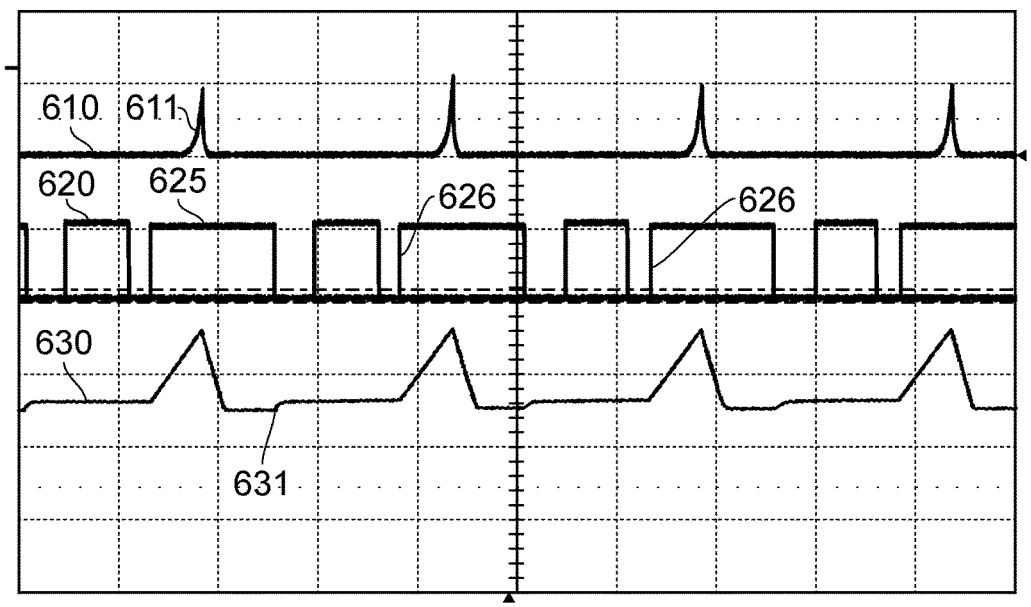
FIG. 6 shows various waveforms from experimental tests of a PFC stage according to one or more embodiments.

FIG. 6 shows various waveforms from experimental tests of a PFC stage according to one or more embodiments, plotted against time on the X-axis or abscissa. From the top the waveforms are, at 610 the drain current Idrain through the power switch 325; at 620 and 625 the logic signals corresponding to calibrate and regulate intervals respectively; and at 630 the gate voltage, Vgs of the power switch 325.

Looking first at the gate voltage Vgs of the power switch 325, this starts to rise at the commencement 626 of the regulate interval. The slope of the rise is determined by the charging current 302. At some point during this charging, the switch has closed sufficiently to start to pass a drain current Idrain. The drain current increases exponentially as shown at 611 until it reaches the predetermined value, at which point the discharging current from the gate is enabled, and the gate voltage starts to fall, again at a predetermined rate—that is to say, with a predetermined slope which is set by the discharge current Idisn (or Idisch, in the case that the charging current is disabled during discharge). As a result the drain current through the main terminals of the power switch 325 decreases to zero.

During this interval the charge on the X-cap has been reduced by an amount corresponding to the area under the curve 610. The sequence is repeated as shown. As already described there may be two or more current pulses during the regulation stage between each calibration stage, in embodiments which include a calibration stage, rather than just the single pulse shown.

Figure 7:
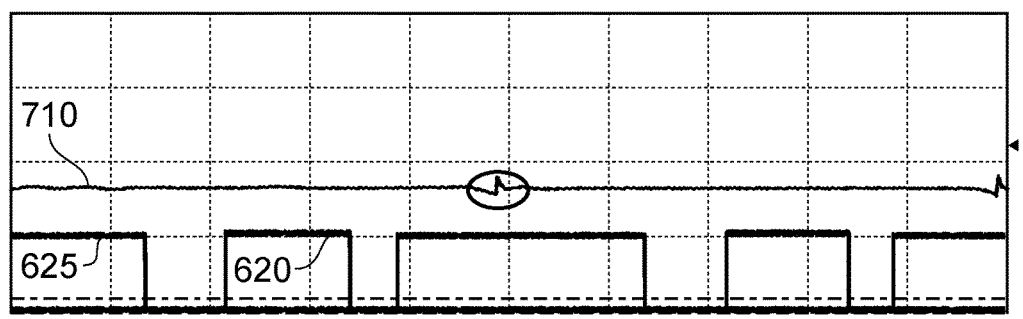
FIG. 7 shows more waveforms from experimental tests of a PFC stage according to one or more embodiments.

FIG. 7 shows more waveforms from experiment tests of a PFC stage according to one or more embodiments. The figure again shows calibration and regulation intervals at 620 and 625 respectively. The voltage at the drain of the power switch is shown at 710; this voltage is almost constant, demonstrating that no power is converted during the discharging process. The skilled person will appreciate that in the event that power was converted, the voltage at 710 would show an increase at the end of the current pulse since Dpfc 322 would conduct to increase the charge on Cboost: the absence of an increase in the voltage is thus indicative the power is not converted. It will also be appreciated that the voltage on the drain of the switch 725 is lower than Vbus.

As result of a different gate source capacitance for different switches, and different precise relationship between Vgs and Idrain, the shape of the drain current versus time may vary between different circuits even if these circuits have the same nominal design, as a result the amount of charge which is removed from the X-cap for each charge-discharge pair may vary. In embodiments in which the regulation interval lasts for a predetermined fixed time, this would result in a different ratio between average current and peak current. In some applications, however there may be a requirement on minimum average current, because this average current together with the value of the X-cap defines the discharge time.

In one or more alternative embodiments, the discharge current is not directly enabled after the desired current is reached, but the charge current is stopped once Vgs has reached the level to enable the planned peak current through the switch. This may allow for the peak current to flow for some longer time, so that the ratio between average discharge current and peak current can be better defined.

As shown in FIG. 6, the regulation interval may have a fixed time; alternatively, in one or more embodiments, the regulation interval may be truncated to finish as soon as the gate is discharged to a certain level where the drain current has reached a value of zero or close to zero. This would provide another way to make the ratio between average discharge current and peak current better defined. The skilled person will appreciate that in such embodiments, the calibrate regulate logic 440 may include a latch circuit, which is reset to commence a subsequent calibration interval, immediately the current to the main terminals decreases to zero, or, for embodiments in which there are multiple current pulses between each calibration interval, after the Nth return to zero.

Figure 8:
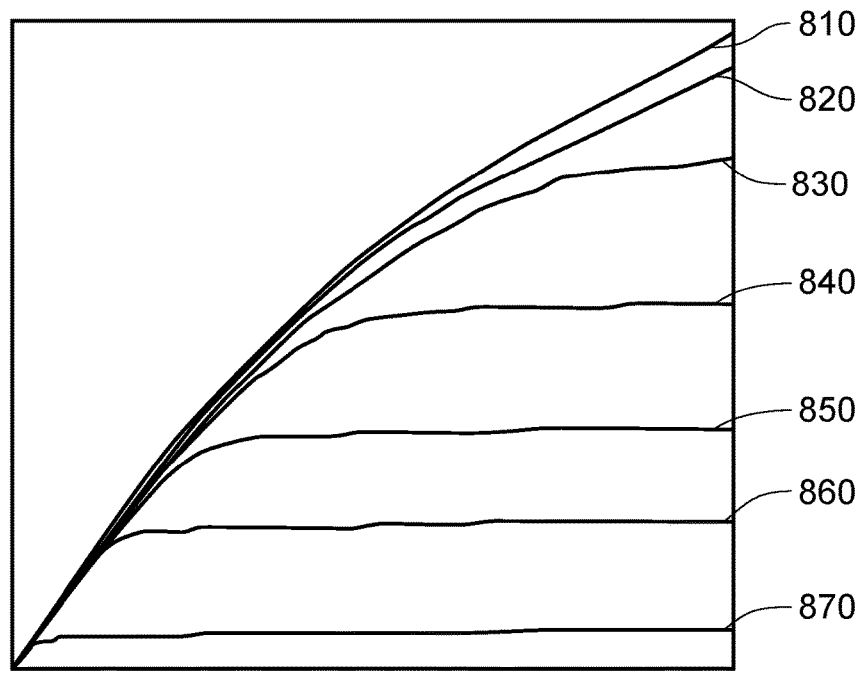
FIG. 8 shows characteristic operating curves of a typical power MOSFET.

Circuits described herein may provide for a discharging of the X-cap within a specified time limit. Depending on maximum allowable voltage—that is to say the voltage down to which the discharge is required—there may be complications associated with the characteristic of the power switch itself. FIG. 8 shows characteristic operating curves of a typical power MOSFET, which may be used as the power switch. The curves 810, 820 . . . 870 show the drain current Id plotted on the y-axis or ordinate against drain-source voltage Vds plotted on the x-axis or abscissa, for decreasing values of the gate source voltage Vgs. At a relatively high Vgs, as shown at 810, the drain current increases monotonically with Vds, with a (nearly constant) slope of 1/Rdson. However, as Vgs decreases, the drain current starts to saturate. The saturated value of the drain current decreases with decreasing Vgs.

When the drain voltage becomes lower than a certain level (in a typical example this may be around 1V at Idrain=2.5 A), the drain current reduces, finally reaching 0 at Vds=0, independent of Vgs. This may result in a gate voltage which is far above the threshold, when the loop tries to find the proper comparator level. If the X-cap discharge function continues when the X-cap is fully discharged, the gate will remain charging until the charging current saturates as no current can flow through the switch anymore (i.e. Idrain is approximately zero).

In the event that the mains is then reconnected, the drain current will be very high with consequential risk of destroying the switch. In order to prevent such an eventuality, it may be appropriate to include a circuit to limit the X-cap discharge, by halting it once the voltage on the input side (that is to say, across X-cap) reduces to a safe level. The safe level may be dependent on the application, but will typically be a level at which it is not harmful for a user to touch the mains plug, that is to say, the input to the circuit, when the mains is disconnected.

Alternatively, or in addition, in one of more embodiments, to prevent such a high drain current a second comparator is included, which compares the voltage across the sense resistor Rsense 350 with a higher voltage—for example in the range of 10 to 50 mV. Such a level is easily detectable and would generally not require any auto-zeroing calibration of the comparator. Detecting such a relatively high voltage across the sense resistor would indicate that the drain current in the switch is high. The X-cap discharging mode of operation may then be immediately terminated, and the switch returns to normal (PFC) operation. As a result the gate of the power switch would be discharged quickly to open the switch and prevent damage.

FIG. 9 shows a PFC stage and controller according to one or more embodiments, comprising such a second comparator 985, which is arranged to compare the voltage across the sense resistor Rsense 350 with a second, or further, reference voltage 991. The second, or further, reference voltage 991, may be 50 mV, as shown. In the event that this second comparator level is reached, the gate is quickly or suddenly discharged. As a result, the condition of only slowly changing Vgs (and low di/dt at drain as a result) is not fulfilled, and there may be an undesired energy transfer to Cboost As shown in FIG. 9 at 920, there may be included a timing circuit which disables the X-cap discharge circuit for a predetermined time period or interval, following discharging of the X-cap. This timing circuit ensures that the energy transfer to Cboost is limited to a lower level than the energy taken by the load connected to Cboost, thereby preventing further voltage rise at Cboost even under the conditions that the mains is reconnected several times shortly after each other; thereby overvoltage and damage of Cboost may be prevented. The second comparator 985 is shown in addition to the comparator 380 which is used to determine the discharge current by comparing this with the reference voltage 491. The reference voltage 491 may be 10 mV, as shown.

The PFC stage and controller shown in FIG. 9 are configured and arranged to operate a method which does not include a calibration interval. The applicant has established in experimental prototype implementations, as shown in FIG. 9, that a calibration stage may not be required; in some embodiments, the level of "zero-drift" associated with a non-calibrated comparator may be acceptable.

The circuit of FIG. 9 includes a further, third, comparator 986, which compares the gate voltage at the gate of the switch with a threshold voltage Vth 992. This comparator is used, as described above, to determine that the gate has discharged sufficiently to end the charging-discharging pair Finally, the circuit may, as shown include a fourth comparator 987, which compares the gate voltage with a high level 993. The high level 993 may be as shown close to the supply voltage. This comparator may be used to sense the condition that the gate has been continuously charging due to inadequate voltage from the supply to trigger the capacitor discharge current. The controller's logic circuit, shown at 940, may then enable the gate driver 910 to operate the power switch in normal operation mode, and in particular to fully discharge the power switch gate. As shown, the logic 940 may enable the driver circuit 910, by means of an enable driver logic sub-circuit 905. The timing circuit which disables the X-cap discharge circuit for a predetermined time period or interval may also be enabled.

Figure 10:
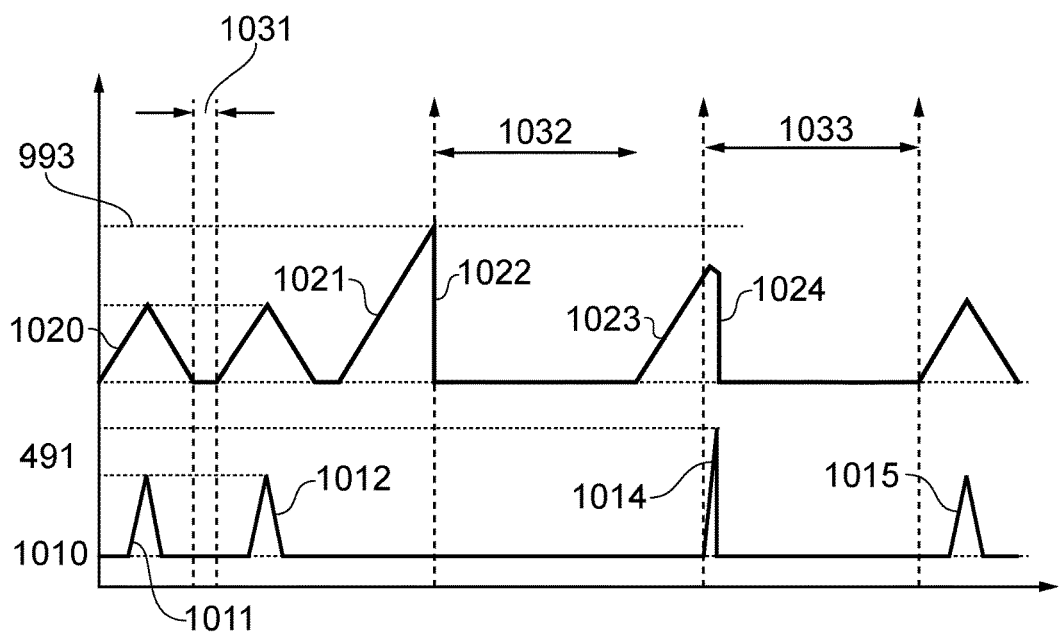
FIG. 10 shows various waveforms associated with an embodiment of FIG. 9.

FIG. 10 shows waveforms corresponding to the voltage across Rsense, and the voltage at the power switch gate, at curves 1010, and 1020 respectively. As shown towards the left-hand side of the figure, the gate voltage rises as the gate is charged by a the gate charging current source 372, until the switch starts to conduct, as shown in the spike in the current through the main terminals, as measured by the voltage 1010 across the sense resistor. Once the current reaches the preset level, the gate is discharged by the discharging current source 374. The gate is discharged such that it is voltage falls. Once the voltage has fallen to a value close to 0 (for example, to Vth in FIG. 9), logic 940 introduces a delay 1031 before the subsequent charging-discharging pair starts. The delay may typically be between 2 ms and 10 ms, and in a specific embodiment; 4 ms. FIG. 10 shows two complete charging-discharging pairs, as shown by the two pulses 1011 and 1012.

On the third charging cycle, the gate is charged, but the voltage on the X-cap is insufficient to drive a capacitor discharging current through the switch. A current pulse through the switch then does not occur; as a result, there is no signal to start the discharge of the gate. The gate thus continues to be charged, and its voltage continues to rise, as shown at 1021. The switch is thereby driven hard "on". The gate voltage continues to increase until it reaches the high voltage level 993 (for instance, the supply voltage minus Vth, as shown in FIG. 9). Once this high reference voltage is reached, logic 940 enables the normal operating mode of the gate driver 910 (through enable driver logic 905) which immediately opens the switch by quickly discharging the gate, as shown in FIG. 10 at 1022.

On the occurrence of the fast discharge, a delay, or wait time, 1032, is started before the X-cap discharge sequence of charging-discharging the switch gate is re-started. The wait may be, for instance, between 50 ms and 250 ms. In a specific embodiment, a wait time of 120 ms was found to be effective. The wait time may be set sufficiently small to ensure that it does not extend the X-cap capacitor discharge time beyond that which is required for instance to meet regulatory requirements—this may typically be 1-2 s, Conversely, it may be set sufficiently long to prevent repeated occurrence of the high reference being reached. Repeated occurrence of this, and in particular the energy transfer which may be associated with fast opening of the switch, might otherwise result in an increase in the bus voltage (Vbus). In the case that no load is drawn from the switch mode power supply, and thus nothing to tend to reduce the voltage of Vbus, this could potentially lead to an overvoltage on Vbus. This may be avoided by the introduction of the delay.

As shown in FIG. 10, at the end of the delay the X-Cap discharging process is restarted by switching on the gate charging current source 372. In the specific example shown in FIG. 10, the user has attempted to reconnect the mains after the gate voltage was sufficiently high to generate the peak-value of the current-pulse 1011, 1012. As result of the mains connected, the switch will be fully on giving a steep di/dt (1014) reaching the level 991.

Thereupon, the fast opening of the switch shown at 1024 triggers the start of another wait period that prevents voltage build up at Cboost, shown at 1033. At the end of this wait period, the X-Cap discharging process is once more re-enabled, and discharging continues, as shown by the pulse 1015.

Figure 11:
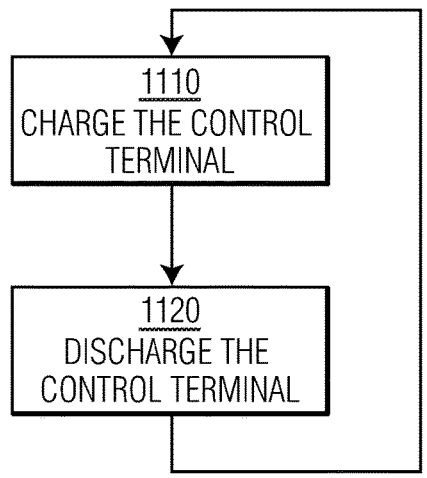
FIGS. 11 to 14 are flow diagrams of methods according to various embodiments disclosed herein.

FIG. 11 shows a flow diagram of a method according to one or more embodiments disclosed herein. The method includes the step 1110 of charging control terminal of a power switch, until the current through the main terminals of the power switch reaches a predetermined level. The method then proceeds at 920 with discharging the control terminal of the power switch. The sequence of charging and discharging is repeated.

Figure 12:
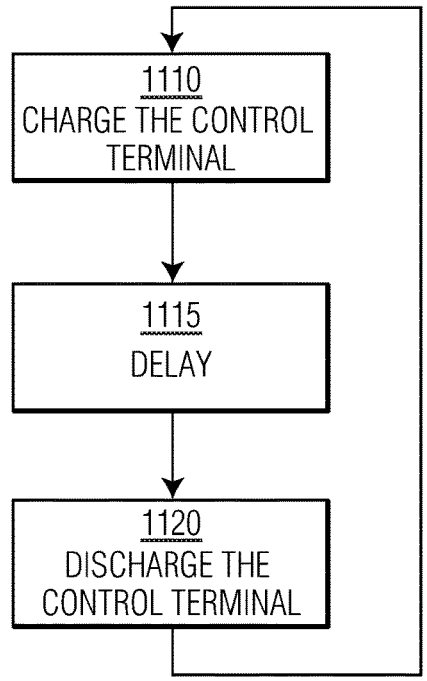

FIG. 12 shows a flow diagram of another method according to one or more embodiments. This method is similar to that shown in FIG. 11, except in that a delay 1115 is introduced between the steps of charging control terminal and discharge control terminal. As described hereinabove, by introducing the delay it may be possible to more closely control the amount of charge which is removed from the X-cap during one or each charge-discharge power.

Figure 13:
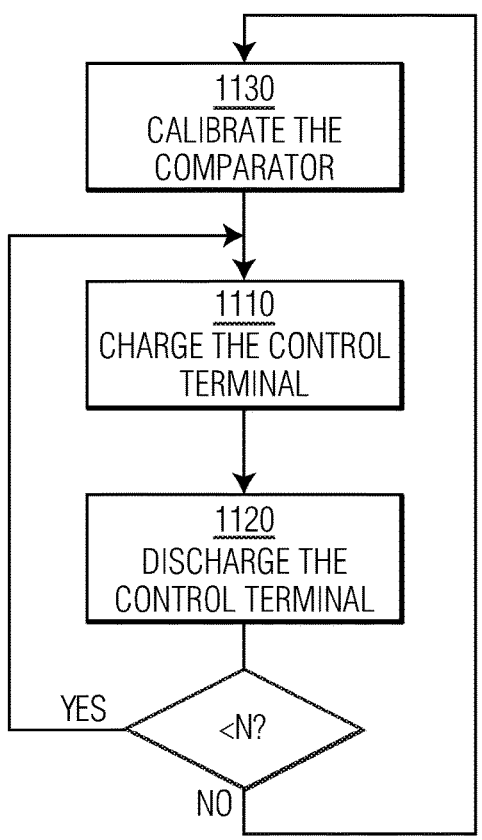

FIG. 13 shows a flow diagram of a further method according to one or more embodiments. This method is similar to that shown in FIG. 11, except that prior to the steps of 1110 charging the control terminal and 1120 discharging the control terminal, a step of calibrating the comparator is introduced.

Figure 14:
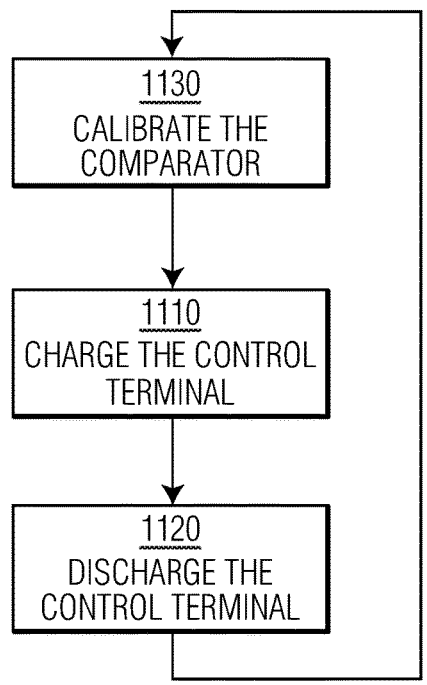

Finally, FIG. 14 shows a flow diagram of yet a further method according to one or more embodiments. This method is similar to that shown in FIG. 13, except that the sequence includes multiple pairs of charging-discharging the control terminal. Thus as shown in FIG. 14, the sequence includes a series of N charge-discharge steps 1110 and 1120, preceded by a single calibration step 1130. The complete sequence is repeated.

Similarly to the method shown in FIG. 11, the methods shown in FIGS. 13 and 14 may each include a delay 1115 (not shown) between the steps of charging control terminal and discharging the control terminal.

From reading the present disclosure, other variations and modifications will be apparent to the skilled person. Such variations and modifications may involve equivalent and other features which are already known in the art of mains and safety circuits, and which may be used instead of, or in addition to, features already described herein.

In particular, the power switch 325 may be a power MOSFET, or other suitable switching device with a control terminal (such as a gate) which does not draw significant current, and main terminals, and which can be driven to be fully open (such as may be required for normal operation), and to be partly open, with a lower transconductance between the main terminals than in its fully open state. An example of such an alternative suitable switching device may be a GaN power switch arranged in cascode configuration with a gate-drive MOSFET.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims [delete if not relevant] and reference signs in the claims shall not be construed as limiting the scope of the claims.

LIST OF REFERENCE SIGNS 100 input circuit
110 mains input
110a live terminal
110b neutral terminal
112 protective earth
114 primary side ground
200 SMPS
210 mains input
220 filter and rectifier stage
240 PFC stage
260 converter stage
310 mains supply
315 EMI filter
316 Capacitor Cin
317 Bridge Rectifier stage
320 PFC stage
321 Inductor Lfpc
322 Diode Dpfc
325 power switch
326 power switch control terminal
327, 328 power switch main terminal
330 second stage
350 resistor Rsense
360 controller
370 switch driver
372 charging current source
374 discharging current source
380 comparator
390 reference current 410 voltage source
420 latch
430 "AND" logic
440 logic circuit regulate/calibrate
474 discharge current source
491 reference voltage Vreg
510 calibration interval
520 regulation interval
610 drain current
611 increasing drain current
620 logic signal calibrate
625 logic signal regulate
626 start of regulate interval
630 Vgs
710 power switch drain voltage
810, 820 . . . 870 drain current Id
905 enable driver logic
910 gate driver
920 timer
940 logic
985 second comparator
986 third comparator
987 fourth comparator
991 second or further reference voltage
992 threshold voltage
993 high voltage level
1010 voltage across Rsense
1011, 1012, current pulse
1014 current pulse
1020 PFC switch gate voltage
1021 rising gate voltage
1022 fast falling gate voltage
1023 rising gate voltage
1024 fast failing gate voltage
1031, 1032, 1033 delay
1110 charge the control terminal
1115 delay
1120 discharge the control terminal
1130 calibrate the comparator

The invention claimed is:

1. A method of discharging an input capacitor of a switch mode power supply, through a power switch in the switch mode power supply, in response to disconnection of the switch mode power supply from a mains supply,
wherein the power switch includes a control terminal and main terminals;
the method comprising a repeated sequence, the sequence comprising:
charging the control terminal of the power switch until a comparator indicates that a capacitor discharge current from the capacitor through the main terminals is equal to a reference signal; and
thereafter discharging the control terminal, thereby stopping the capacitor discharge current;
further comprising comparing the current through the main terminals with a further reference signal which is higher than the reference signal, and terminating the method in response to the current through the main terminals being higher than the further reference signal;
wherein terminating the method includes disabling the sequence for a pre-determined time period.

2. The method of any of claim 1, wherein discharging the control terminal commences immediately the comparator indicates that the current through the main terminals is equal to a reference current.

3. The method of claim 1, wherein the sequence further comprises calibrating the comparator.

4. The method of claim 3, wherein the sequence further comprises a further (N−1) pairs of charging and discharging the control terminal sequences, such that the comparator is calibrated between each group of N pairs of charging and discharging the control terminal sequences,
wherein N is at least 2.

5. The method of claim 3, wherein calibrating the comparator comprises connecting both its inputs to a common ground.

6. The method of claim 1, wherein the control terminal charging current is half the control terminal discharging current.

7. The method of claim 1, where the duration of the sequence is fixed.

8. The method of claim 5, wherein the comparator is calibrated immediately the control terminal is discharged.

9. The method of claim 4, wherein charging the control terminal commences immediately the control terminal is discharged for the first to (N−1)th time during a sequence, and the comparator is calibrated immediately the control terminal is discharged for the Nth time during a sequence.

10. A controller for a switched mode power supply connectable to a mains supply and comprising an input capacitor and a power switch, the power switch having a control terminal and main terminals,
the controller comprising:
a comparator configured to compare a capacitor discharge current from the capacitor through the main terminals with a first reference signal;
a switch driver to control the power switch;
a charging current source; and
a discharging current source;
wherein the controller is configured to operate a repeated sequence, in response to disconnection of the switch mode power supply from the mains supply,
the sequence comprising:
charging the control terminal by means of at least the charging current source of the power switch until a comparator indicates that the capacitor discharge current is equal to the first reference signal; and
discharging the control terminal by means of at least the discharging current source;
further comprising comparing the current through the main terminals with a second reference signal which is higher than the first reference signal, and terminating the sequence in response to the current through the main terminals being higher than the second reference signal;
wherein terminating the sequence includes disabling the sequence for a pre-determined time period.

11. A controller as claimed in claim 10, further comprising a safety comparator configured to compare the current through the main terminals with a third reference signal and to immediately discharge the control terminal in response to the current through the main terminals being greater than the third reference signal.

12. A controller as claimed in claim 10, wherein the power switch is a power MOSFET.

13. A switch mode power supply comprising:
a controller as claimed in claim 10;
the power switch, and
the input capacitor.

14. A method of discharging an input capacitor of a switch mode power supply, through a power switch in the switch mode power supply, in response to disconnection of the switch mode power supply from a mains supply, wherein the power switch includes a control terminal and main terminals;
the method comprising a repeated sequence, the sequence comprising:
  charging the control terminal of the power switch until a comparator indicates that a capacitor discharge current from the capacitor through the main terminals is equal to a reference signal; and
  thereafter discharging the control terminal, thereby stopping the capacitor discharge current;
wherein the sequence further comprises calibrating the comparator;
wherein the sequence further comprises a further (N−1) pairs of charging and discharging the control terminal sequences, such that the comparator is calibrated between each group of N pairs of charging and discharging the control terminal sequences;
wherein N is at least 2; and
wherein charging the control terminal commences immediately the control terminal is discharged for the first to (N−1)th time during a sequence, and the comparator is calibrated immediately the control terminal is discharged for the Nth time during a sequence.

* * * * *